United States Patent [19]

Lair et al.

[11] Patent Number: 4,674,754
[45] Date of Patent: Jun. 23, 1987

[54] BACK-UP MEANS FOR FLUID CYLINDER AND METHOD FOR USING SAME

[75] Inventors: Verle D. Lair; Paul D. Lair, both of Spencer, Iowa

[73] Assignee: Verco Engineered Sales Co., Spencer, Iowa

[21] Appl. No.: 808,074

[22] Filed: Dec. 12, 1985

[51] Int. Cl.⁴ .................. F16J 9/00; F16J 15/16; F16J 15/24

[52] U.S. Cl. ......................... 277/1; 277/70; 277/188 A; 277/201

[58] Field of Search .............. 277/1, 180, 215, 188 R, 277/188 A, 189.5, 201, 70, 75

[56] References Cited

U.S. PATENT DOCUMENTS

| | | | |
|---|---|---|---|
| 2,456,356 | 12/1948 | Aber | 277/188 A X |
| 2,520,306 | 8/1950 | Detweiler | 277/188 A X |
| 2,727,471 | 12/1955 | Martin | 277/188 R |
| 2,728,620 | 12/1955 | Krueger | 277/188 A |
| 3,171,334 | 3/1965 | Rasmussen | 277/188 A X |

FOREIGN PATENT DOCUMENTS 564250 10/1958 Canada .................. 277/70
726954 3/1955 United Kingdom .............. 277/201

*Primary Examiner*—Allan N. Shoap
*Attorney, Agent, or Firm*—Zarley, McKee, Thomte, Voorhees & Sease

[57] ABSTRACT

The back-up rings of the present invention are seated on opposite sides of a sealing ring within an annular groove of a hydraulic piston. The sealing ring is in frictional engagement with the interior surface of the hydraulic cylinder, and the back-up rings are positioned within the cylinder groove and on opposite sides of the sealing ring. At least one of the back-up rings includes a vent hole extending axially therethrough to permit the alleviation of any fluid pressure accumulating between the two spaced apart back-up rings. As an alternative to the axial vent hole, a groove may be provided on the interior perimeter of the back-up ring or the back-up ring may include a complete break therein for permitting the venting of fluid trapped between the two back-up rings. The method of the present invention includes venting any fluid which is trapped between the two back-up rings during reciprocation of the piston within the cylinder.

10 Claims, 15 Drawing Figures

U.S. Patent  Jun. 23, 1987  4,674,754
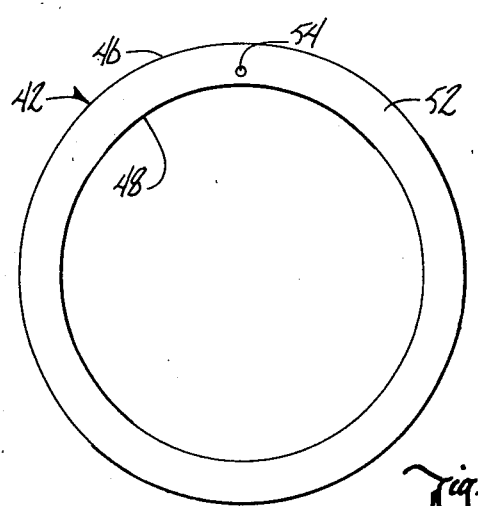
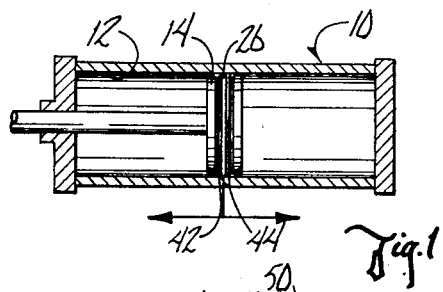
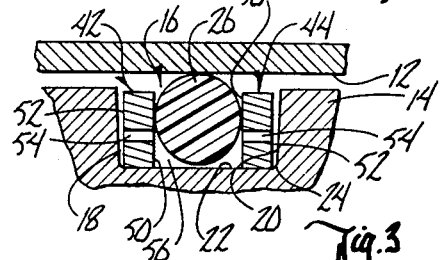
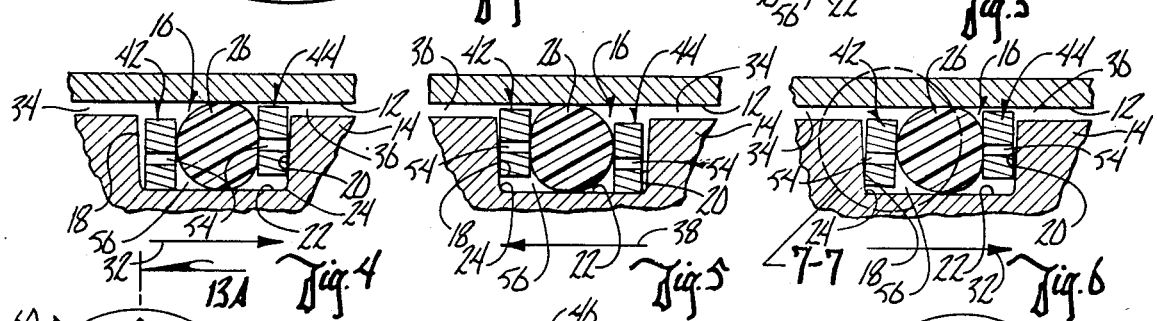
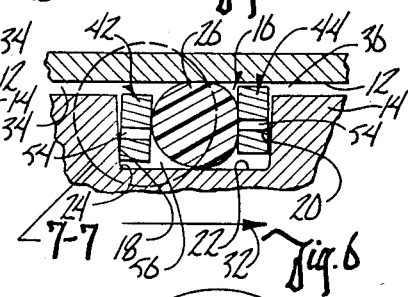
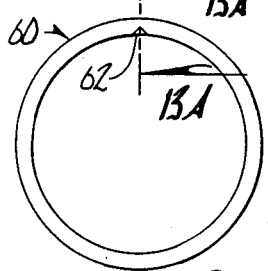
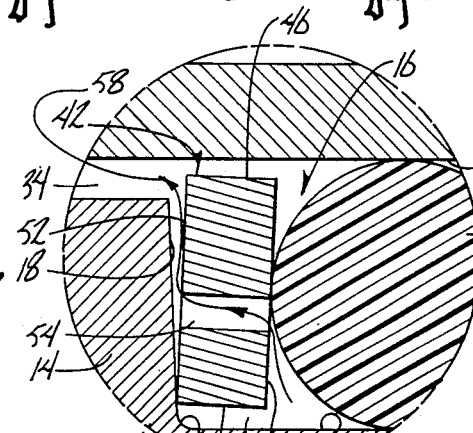
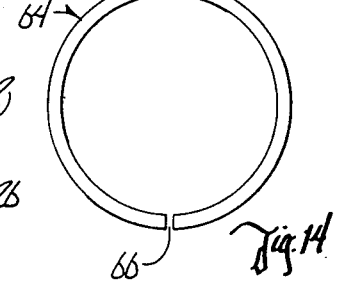
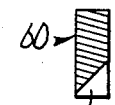
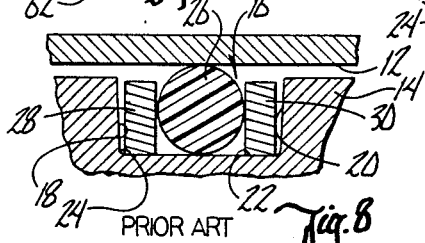
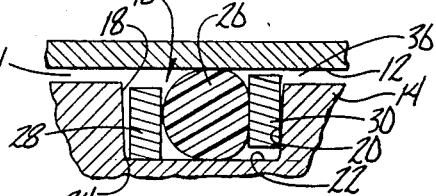
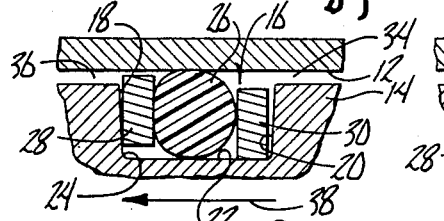
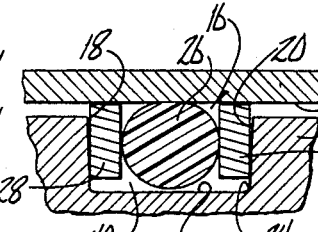
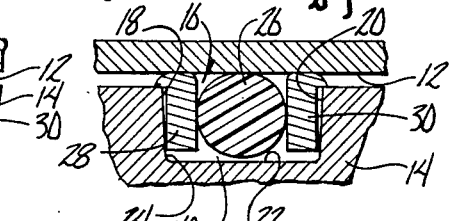

4,674,754

BACK-UP MEANS FOR FLUID CYLINDER AND METHOD FOR USING SAME

BACKGROUND OF THE INVENTION

This invention relates to a back-up means for a fluid cylinder and a method for using the same.

Back-up rings have been provided in the prior art for reinforcing an elastomeric sealing ring in hydraulic and pneumatic cylinders. The sealing ring may comprise an O-ring, or it can be in various other shapes such as the shape of a U-cup, a D-ring, or a square ring. It is adapted to engage the interior surface of the cylinder so as to provide a seal between the piston and the cylinder.

The O-ring is usually fitted within an annular groove extending around the perimeter of the piston. During reciprocation of the piston, because of the flexible nature of the sealing ring, it is desirable to provide reinforcement for the sealing ring so that it does not become extruded into the clearance gap between the piston and the cylinder during reciprocating movement of the piston within the cylinder.

A pair of spaced apart back-up rings have been utilized in the prior art to provide reinforcement to the sealing ring. The back-up rings are usually positioned on opposite sides of the sealing ring wihtin the annular groove surrounding the piston.

FIGS. 8–12 illustrate the use of prior art back-up rings. Cylinder 10 includes an interior cylinder wall 12. Reciprocatingly mounted within cylinder 10 is a piston 14 having an annular groove 16 therein. Groove 16 includes first and second annular end walls 18, 20 which are inclined slightly and an annular bottom wall 22 which extends between end walls 18, 20. A rounded caming surface 24 is provided at the junctures between end walls 18, 20 and the opposite ends of bottom wall 22.

Seated within annular groove 16 is an elastomeric sealing ring 26 having a pair of back-up rings 28, 30 on opposite sides thereof.

FIG. 8 illustrates the position of the back-up rings 28, 30 and sealing ring 26 when the piston is at rest.

FIG. 9 shows the position of the components during movement of the piston in the direction indicated by arrow 32. With piston 14 moving in the direction of arrow 32, a fluid pressure builds up to the left in the general area designated by the numeral 34. This, together with the friction of the sealing ring 26 against the interior cylindrical wall 12 causes the sealing ring to be urged to the right as viewed in FIG. 9 within groove 16. This movement of sealing ring 26 also causes back-up ring 30 to be cammed radially outwardly by virtue of engagement with camming surface 24 and the inclined wall 20 of groove 16. Back-up ring 30 consequently provides reinforcement for sealing ring 26 and prevents extrusion of sealing ring 26 into the clearance 36 between the piston and the cylinder on the low pressure side of the sealing ring 26.

FIG. 10 illustrates the relative positions of the components when the piston is moving in the direction as indicated by arrow 38. During this movement the relative positions of the components are reversed from that shown in FIG. 9. Back-up ring 28 is urged to the left and cams radially outwardly in response to engagement of camming surface 24 and inclined wall 18 of groove 16. With the piston moving to the left as shown in FIG. 10, clearance area 34 becomes the high pressure fluid area and clearance area 36 becomes the low pressure fluid area.

FIG. 11 shows the relative position of the components after the piston has been reciprocating for sufficient time to cause a heat build-up due to friction. As the hydraulic oil or other fluid media heat up due to friction, and other factors, the diameter of the back-up rings increases due to the expansion of the back-up rings as they are heated. This causes the back-up rings to expand outwardly until they engage the interior surface 12 of the cylinder bore as shown in FIG. 11. In this position the back-up rings 28, 30 function as a seal against the interior surface 12 of the hydraulic cylinder. It should be noted that in the position shown in FIG. 11, the two back-up rings 28, 30 form a fluid sealed compartment designated by the numeral 40 which is defined between the two back-up rings 28, 30 and the bottom wall 22 of annular groove 16.

In this position, fluid is trapped in the fluid sealed compartment 40, and continued reciprocation of the cylinder causes a build-up of heat in the fluid within compartment 40. Since the fluid cannot escape, it expands and the temperature build-up is substantially increased, thereby causing continual build-up of the temperature within the back-up rings 28, 30. As the back-up rings 28, 30 increase in temperature they continue to expand radially outwardly, and the compartment 40 becomes super pressurized due to thermal expansion. Ultimately back-up rings 28, 30 are deformed or extruded as shown in FIG. 12. Sometimes the expansion of the back-up rings, instead of causing extrusion of the back-up rings, causes the piston wall to break or crack. When this happens the pressure is relieved between the two back-ups, but the system is usually destroyed or the equipment that the cylinder operates is damaaged.

Therefore, a primary object of the present invention is the provision of a back-up means for fluid or pneumatic cylinders and method for using the same which will minimize the build-up of heat during reciprocating movement of the piston within the cylinder.

A further object of the present invention is the provision of a back-up means for fluid and pneumatic cylinders and method for using same which minimizes the expansion of the back-up rings in response to heat build-up so that the back-up rings do not become extruded or cause damage to the cylinder wall or cylinder piston.

A further object of the present invention is the provision of a back-up means for fluid and pneumatic cylinder and method for using same which will alleviate fluid pressure between the two back-up rings by venting the fluid which is trapped in the space between the back-up rings so that pressure cannot build up.

A further object of the present invention is the provision of a device which is economical to manufacture, durable in use and efficient in operation.

SUMMARY OF THE INVENTION

The present invention minimizes the expansion of the back-up rings in response to heat by venting the fluid trapped between the two back-up rings so that there will not be a temperature build-up between the two back-up rings during continued reciprocating movement of the piston within the cylinder. The venting may be accomplished in the preferred embodiment by providing a small aperture extending axially through the back-up ring. This permits the hydraulic fluid between the two back-up rings to escape, thereby minimizing the temperature build-up during reciprocation of the piston.

An alternative form of the invention utilizes a small notch in the interior diameter edge of the back-up ring. This notch is also capable of alleviating fluid pressure between the two back-up rings.

A third modification of the invention utilizes a back-up ring which is a split ring having a small break in at least one point around its circumference. This small break provides means for venting the fluid between the two back up rings.

BRIEF DESCRIPTION OF THE FIGURES OF THE DRAWINGS

FIG. 1 is a sectional view of a hydraulic cylinder utilizing the present invention.

FIG. 2 is a front elevational view of a back-up ring of the present invention.

FIG. 3 is a partial sectional view of a piston within the cylinder having a sealing ring and back-up rings, and showing the piston at rest within the cylinder.

FIG. 4 is a view similar to FIG. 3 showing the position of the components when the piston is moving to the right.

FIG. 5 is a sectional view similar to FIG. 3 showing the relative position of the parts when the piston is moving to the left within the cylinder.

FIG. 6 is a view similar to FIG. 4, but showing the relative positions of the parts after the fluid has been heated in response to continuous reciprocating movement of the piston within the cylinder.

FIG. 7 is an enlarged sectional view taken along line 7—7 of FIG. 6.

FIGS. 8, 9, 10, 11 and 12 are sectional views showing the use of prior art components during the reciprocating movement of the piston within the cylinder.

FIG. 13 is a front elevational view of a modified form of the back-up ring of the present invention.

FIG. 13A is a sectional view taken along line 13A—13A of FIG. 13.

FIG. 14 is a front elevational view of a further modification of the present invention.

DETAILED DESCRIPTION OF THE PREFERRED EMBODIMENT

Referring to FIGS. 1–7, the parts of the cylinder, piston, annular groove and sealing ring previously described in FIGS. 8–12 remainunchanged, and therefore corresponding numerals are used to indicate the parts previously described.

Mounted within annular groove 16 on opposite sides of sealing ring 26 are a pair of back-up rings 42, 44. The construction of back-up rings 42, 44 is identical, and is illustrated by back-up ring 42 shown in FIG. 2. Ring 42 includes an outer perimetric edge 46, an inner perimetric edge 48, and a pair of opposite axially presented faces 50, 52.

Extending axially through each of back-up rings 42, 44 is a vent aperture 54 which extends axially as can be seen in FIGS. 3–6. Aperture 54 is preferably positioned slightly below the midpoint between inner edge 48 and outer edge 46 of back-up ring 42. This insures that the aperture 54 is positioned slightly below the contact point between the back-up rings 42, 44 and the outer perimeter of sealing ring 26.

Back-up rings 42, 44 may be made of a material substantially more rigid than the material of elastomeric ring 26. Examples of materials which will work satisfactorily are urethane, rubber, Teflon, and polyester elastomers. The preferred material is polyester elastomers which, while they are substantially more rigid than the material of ring 26, will nevertheless cam radially outwardly when pressed against inclined walls 18, 20 of groove 16.

FIG. 3 shows the position of the components of the present invention while the piston is at rest. In this position, the apertures 54 are positioned slightly below the contact points between O-ring 26 and back-up rings 42, 44. The back-up rings 42, 44 and the O-ring 26, together define a fluid compartment 56. Compartment 56, however, unlike the compartment 40 shown in FIG. 11, is vented by means of apertures 54 so that fluid pressure cannot build up therein.

FIG. 4 illustrates the relative position of the parts as the piston is moving to the left. Back-up ring 44 is cammed radially outwardly so as to provide a back-up support for O-ring 26. However, since no pressure is applied to back-up ring 42, the back-up ring 42 remains in an unexpanded state so that aperture 54 provides communication to the fluid compartment 56.

FIG. 5 illustrates the relative position of the components when the piston is moving to the left within cylinder 10. In this position, the back-up ring 42 is cammed radially outwardly but the back-up ring 44 is not, thereby leaving vent aperture 54 of back-up ring 44 in communication with the fluid compartment 56.

FIG. 6 shows the relative positions of the components after extended reciprocating movement of the piston within the cylinder. As the result of high frequency movement of the piston within the cylinder, friction produces heat in the area of groove 16, thereby causing the sealing ring 26 and the back-up rings 42, 44 to expand radially outwardly. As the fluid within compartment 56 is heated, it expands, and exerts an outwardly expanding force against the trailing back-up ring 42. This expanding force causes the back-up ring 42 to be slightly canted in the position shown in FIGS. 6 and 7. This canted movement exposes the aperture 54 in the trailing back-up ring 42 to the compartment 56, thereby causing the fluid therein to be vented outwardly as indicated by the arrow 58. The venting of this fluid prevents a pressure build-up within compartment 56, and alleviates the tendency of the fluid therein to be elevated to such an extent that it causes expansion of the back-up rings to the point where they bind against the interior cylindrical wall 12 of piston 14. Thus, by venting the compartment 56 through apertures 54 in back-up rings 42, 44, it is possible to keep the temperature low enough that the back-up rings do not expand and bind against the cylindrical wall 12. Consequently, the back-up rings are not damaged, distorted or extruded in the manner shown in FIG. 12, nor do they expand to the point where they cause cracking or damage to the piston.

FIG. 13 shows an alternative form of the back-up ring which is designated by the numeral 60. Ring 60 includes a notch 62 which is shown in cross-section in FIG. 13A. This notch permits venting of the fluid from chamber 56 so that the temperature and pressure do not build up in compartment 56.

Referring to FIG. 14, a modified form of the invention is designated by the numeral 64. Ring 64 is a split ring having at least one brake 66 therein. This brake 66 provides the function of venting the fluid within compartment 56.

While the form of back-up ring 42 shown in FIG. 2 is the preferred embodiemnt of the present invention, the modified forms 60 (in FIG. 13) and 64 (in FIG. 14) can be used in the same fashion as shown in FIGS. 3-6, and will result in alleviating of the pressure within the compartment 56.

The present invention therefore prevents heat buildup due to thermal expansion and also reduces the likelihood that the back-up rings will extrude as shown in FIG. 12.

Thus, it can be seen that the device accomplishes at least all its stated objectives.

What is claimed is:

1. Back-up means for use in combination with a fluid cylinder having an interior cylinder surface, a piston mounted for reciprocating movement in said cylinder, said piston having an outer cylindrical surface spaced radially inwardly a predetermined clearance distance from said interior cylinder surface of said cylinder, an annular groove being formed in said outer cylindrical surface of said piston, said groove having an annular axially extending groove bottom wall and first and second groove side walls extending radially outwardly from the opposite axial ends of said groove bottom wall, an elastomeric ring seal surrounding said piston and seated within said annular groove between said first and second groove side walls, said ring seal having opposite side surfaces and an outer perimetric edge, said perimetric edge sealingly engaging said interior cylinder surface of said cylinder; said back-up means comprising:

first and second back-up rings surrounding said piston and positioned within said annular groove on opposite sides of said ring seal;

each of said back-up rings comprisng an outer perimetric edge, an inner edge positioned radially inwardly from said outer edge and a pair of opposite ring faces presented in opposite axial directions;

said back-up rings being at times during reciprocating movement of said piston in sealing engagement with both of said side surfaces of said ring seal to form a fluid sealed compartment defined by said spaced apart back-up rings, said ring seal, and said annular groove bottom wall;

each of said back-up rings having a pressure relief means positioned between said outer edge and said inner edge of said back-up ring for providing fluid communication form said fluid sealed compartment to the exterior of said fluid sealed compartment so as to release a buildup of fluid pressure and heat within said fluid sealed compartment during reciprocating movement of said piston within said cylinder.

2. Back-up means according to claim 1 wherein said pressure relief means comprises an aperture extending through said back-up ring and having an axially extending aperture axis.

3. Back-up means according to claim 2 wherein said aperture axis is located radially inwardly from the midpoint of the distance between said inner edge and said outer edge of said back-up ring.

4. Back-up means according to claim 3 wherein said back-up rings each comprise an enclosed ring completely and continuously surrounding said annular groove bottom wall.

5. Back-up means according to claim 3 wherein said back-up rings are each substantially circular in shape.

6. Back-up means according to claim 1 wherein said pressure relief means comprises a notch in one of said inner and outer edges of said back-up ring.

7. Back-up means according to claim 1 wherein at least one of said back-up rings comprises a split ring having at least one break in continuity around its perimeter, said break forming a gap extending transversely between and through said ring faces, said pressure relief means being formed by said break in continuity.

8. Back-up means according to the claim 1 wherein the width between the outer perimetric edge and the inner edge of each back-up ring is less than the distance between the interior cylinder surface and the groove bottom wall of the annular groove.

9. Back-up means according to claim 1 wherein the first and second groove sidewalls of the annular groove are obtusely angled from the groove bottom wall.

10. A method for using back-up means in a fluid cylinder having an interior cylinder surface, a piston mounted for reciprocating movement in said cylinder, said piston having an outer cylindrical surface spaced radially inwardly a predetermined clearance distance from said interior cylinder surface, an annular groove being formed in said outer cylindrical surface of said piston, said groove having an annular axially extending groove bottom wall and first and second groove side walls extending radially outwardly from the opposite axial ends of said groove bottom walls, an elastomeric sealing ring surrounding said piston and seated within said annular groove between said first and second groove side walls, said sealing ring having opposite side surfaces and an outer perimetric edge, said perimetric edge engaging said interior cylinder surface; first and second back-up rings surrounding said piston and positioned within said annular groove on opposite sides of said elastomeric seal; each of said back-up rings comprising an outer perimetric edge, an inner edge positioned radially inwardly from said outer edge, and a pair of opposite ring faces presented in opposite axial directions; said back-up rings being at times during reciprocating movement of said piston in sealing engagement with both of said side surfaces of said sealing ring to form a fluid sealed compartment defined by said spaced apart back-up rings; said sealing ring, and said annular groove bottom wall; said method comprising:

reciprocating said piston within said cylinder in such a manner that friction between said sealing ring, said back-up rings, and said interior cylinder surface produces sufficient heat to cause said back-up rings to expand radially outwardly and to cause a sealed fluid compartment to be formed adjacent said bottom groove wall by said back-up rings, said sealing ring, said groove side walls, and said groove bottom wall;

continuing to reciprocate said piston so that additional frictional heat is produced, thereby causing expansion of any fluid trapped within said sealed fluid compartment;

venting said sealed fluid compartment through an opening extending transversely between and through said ring faces in at least one of said back-up rings, said opening providing fluid communication between the interior and exterior of said sealed fluid compartment so as to alleviate the build-up of fluid pressure and temperature adjacent said back-up rings.

* * * * *